Feb. 15, 1966   T. J. DEEREN   3,235,065
ARTICLE SUPPORTING AND PROTECTIVE DEVICE
Filed March 19, 1963   2 Sheets-Sheet 1
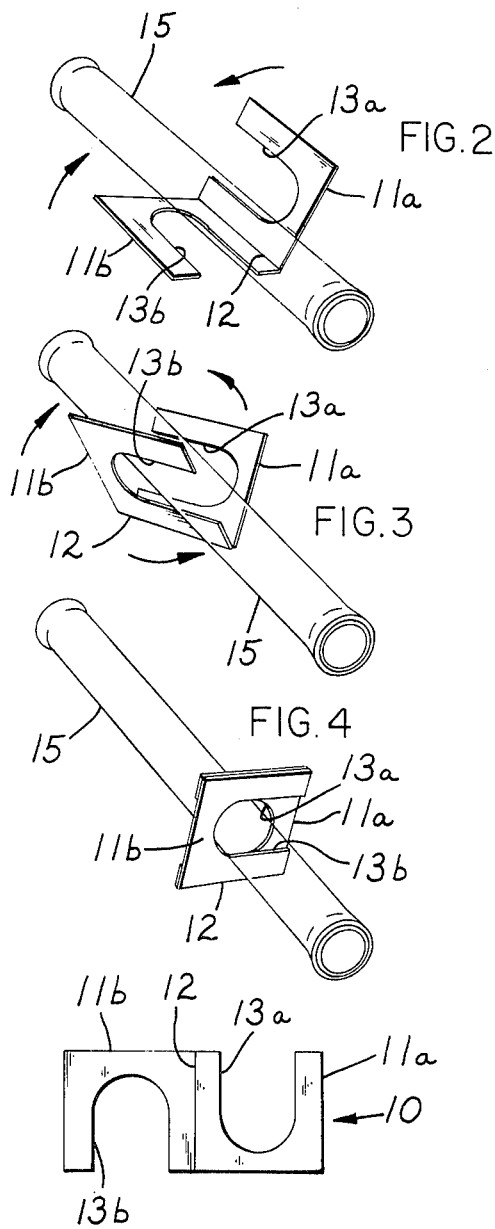
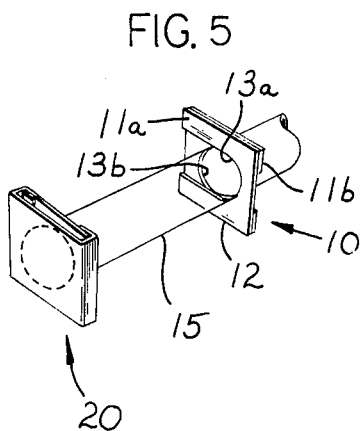
INVENTOR.
THOMAS J. DEEREN
BY E. J. Holler &
W. A. Schaich
ATTORNEYS

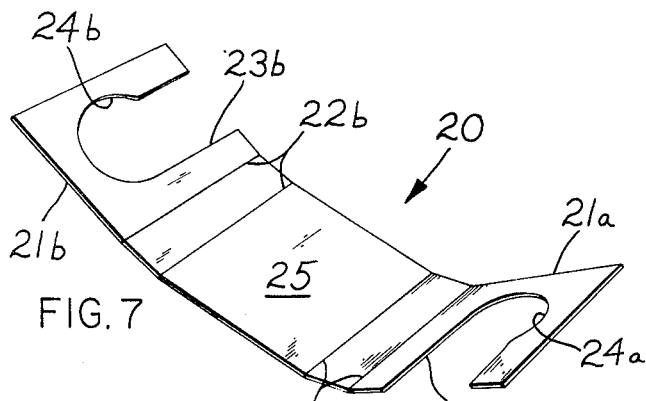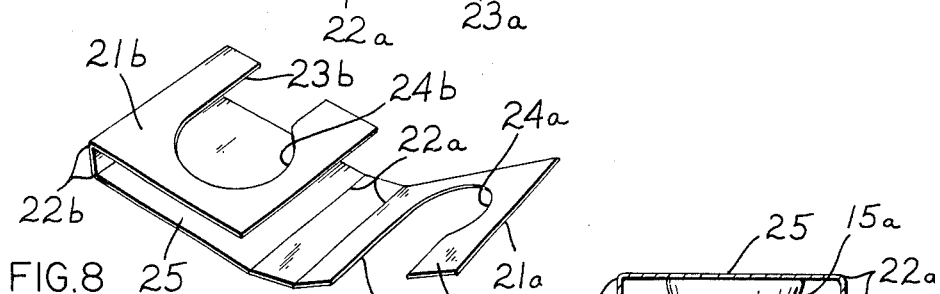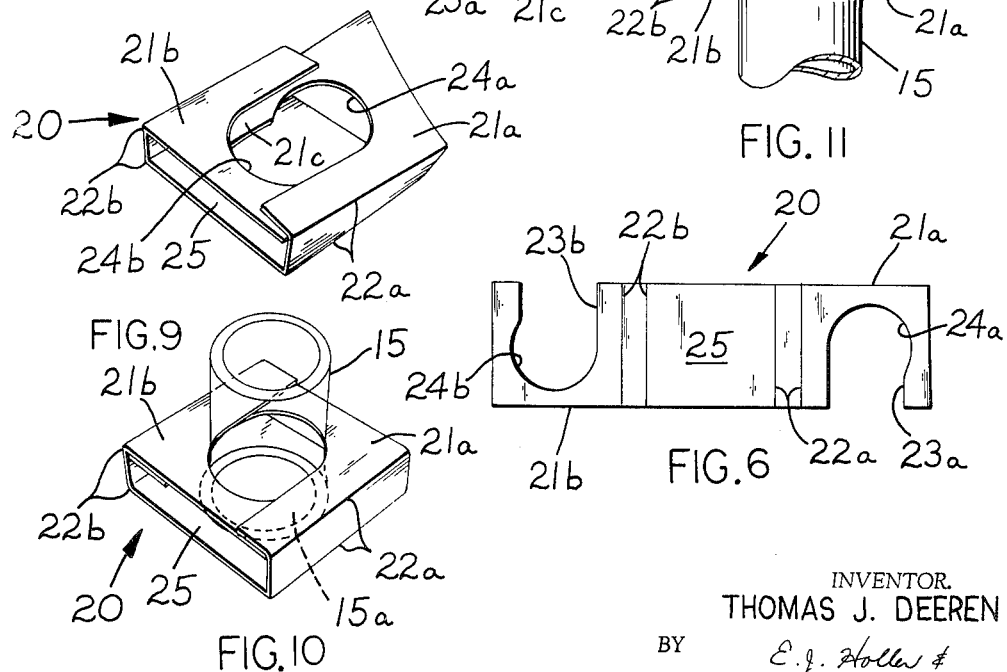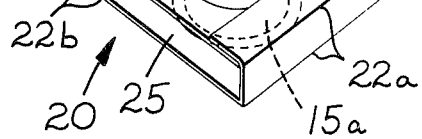

United States Patent Office 3,235,065
Patented Feb. 15, 1966

3,235,065
ARTICLE SUPPORTING AND PROTECTIVE DEVICE
Thomas J. Deeren, Maumee, Ohio, assignor to Owens-Illinois Inc., a corporation of Ohio
Filed Mar. 19, 1963, Ser. No. 266,250
1 Claim. (Cl. 206—46)

The present invention relates generally to an article supporting device and, more specifically, to a self-locking shipping and protective device formed of foldable sheet-like material for supporting and retaining an elongated article during its shipment, storage, and handling to the point of installation and use.

Previously in the manufacture and shipment of lengthy frangible products of substantial size and weight such as glass pipe sections and the like, it has been necessary to resort to complicated and costly shipping cartons or individual wrapping means to retain individual sections in spaced-apart relation within a multiple-unit pack. The especially-tooled flanged end portions and protracted overall length of glass pipe sections, for example, require that both the end portions and intermediate areas of each section in a multiple-unit pack be protected and supported against forceful impacts from like sections as well as surface-to-surface contact during shipping and handling.

The present invention is primarily directed to a self-locking supporting element formed of foldable sheet-like material such as corrugated paper linerboard or laminated foamboard formed from paper liners bonded to an intermediate core of foamed plastic material. The subject device in its several embodiments is fully capable of supporting and protecting both end and intermediate portions of elongated products such as cylindrical glass pipe sections having flared ends as well as other products which are fragile or frangible in nature. The supporting device is characterized by a one-piece rectangularly-shaped element formed of foldable sheet material having juxtaposed edge openings formed in laterally-spaced parallel relation so that on doubling the device into erected condition a complete aperture is formed therein capable of transversely surrounding a localized region of the elongated article.

Accordingly, it is an object of this invention to provide an improved self-locking supporting and retention device for engaging a localized region of an elongated article.

Another object of this invention is to provide an improved supporting and retention device which is capable of application to a wide variety of preselected regions of an elongated cylindrical product to facilitate its firm and positive support.

Another object of this invention is to provide a simple easily-erected retention device for supporting either end or intermediate areas of a heavyweight cylindrically-shaped frangible article to facilitate its protection and support either in a multiple-unit pack or in a separate individual package.

A further object of the present invention is to provide a novel self-locking foldable supporting element for transversely engaging a selected portion of an elongated article, which element provides at least twin-ply perimetrical portions extending throughout its major edge surfaces in erected form and which may be rapidly assembled and disassembled.

The specific nature of this invention, as well as other objects and advantages thereof, will become apparent to those skilled in the art from the following detailed description taken in conjunction with the annexed sheets of drawings on which, by way of preferred example only, are illustrated the preferred embodiments of this invention.

In the accompanying drawings:

FIG. 1 is a plan view of a blank utilized to form one embodiment of the present invention;

FIGS. 2–4 are perspective views illustrating the several steps required to fold the blank shown in FIG. 1 into assembled relation supporting a tubular article;

FIG. 5 is a perspective view of several embodiments of the invention in erected condition;

FIG. 6 is a plan view of a second blank illustrating another embodiment of the invention;

FIGS. 7–9 are perspective views illustrating erection of the blank shown in FIG. 6 into erected condition;

FIG. 10 is a perspective view of such second embodiment in erected condition surrounding the end portion of a tubular article; and FIG. 11 is an elevational view partly in vertical section of the embodiment shown in FIG. 10.

Referring now to FIG. 1 the blank 10 is preferably formed of foldable sheet material such as corrugated liner board comprised of paper or laminated board such as one comprised of combined paper liners and an intermediate core of foamed resilient thermoplastic material. Blank 10 comprises a rectangularly-shaped sheet of material which has been cut and scored to provide at least a pair of foldably connected end panels 11a and 11b. The pair of end panels 11a and 11b are connected along an intermediate score line 12 which extends in a straight line between its near edges. Each end panel 11a and 11b has a U-shaped opening 13a and 13b respectively formed in an edge portion in oppositely-aligned parallel relation. Openings 13a and 13b have a similar configuration and a semi-circular base portion extending adjacent the opposite side of the blank. The openings are formed in parallel alignment with central score line 12 and have a nearly equivalent cross-sectional area.

Referring to FIGS. 2–5 the protective device is erected by placing the elongated article such as the glass pipe section 15 in parallel alignment with foldable score line 12. End portions 11a and 11b are folded toward each other around pipe section 15 and fold line 12 in simultaneously rotated through a right angle (essentially 90°) to place the panels 11a and 11b in back-to-back parallel contacting relation disposed transversely of the article axis. The semi-circular shaped base portion of each opening surrounds a localized exterior portion of the elongated article. The diameter of openings 13a and 13b is preferably equal to or slightly less than the portion of the elongated article to be supported to ensure a snug fit therearound.

The free terminating edges of end panels 11a and 11b which are brought together into near parallel relation as shown in FIGS. 2–4 and 5 may be held together by a strip of pressure sensitive tape (not shown). Where the full aperture formed by the base portions of openings 13a and 13b has a diameter slightly smaller than the diameter of the article, the free edges are held in place by a wedging action and need not be constrained by any supplementary means.

The first embodiment designated by the numeral 10 is shown in assembled relation in FIG. 5 supporting an intermediate area of a cylindrical product and a second embodiment designated by the numeral 20 is shown retaining an end portion of the same article.

The blank 20 shown in FIG. 6 is also preferably formed of foldable sheet material such as corrugated paper linerboard or laminated paper and plastic foam board. Blank 20 comprises a rectangularly-shaped sheet of material which has been cut and scored to provide a pair of movably connected end panels 21a and 21b. A series of four parallel score lines are located in pairs designated by the numerals 22a and 22b adjacent each of the end panels 21a and 21b with a rigid central portion 25 disposed therebetween. End panel 21a has a U-shaped opening 23a formed therein facing a lengthwise edge of the blank and end panel 21b has a similar U-shaped parallel opening 23b formed therein facing the opposite lengthwise edge. The base portion of opening 23a has a generally semi-circular contour 24a and a slightly greater width than the region adjacent the cut edge. The base portion of openings 24a and 24b has an arcuate extent of about 225° and the innermost extremity of the opening extends adjacent the opposite lengthwise edge of the blank.

As shown in FIGS. 7–9 the adjacent pair of parallel score lines 22b are each capable of being folded at right angles to arrange end panel 21b parallel to rigid central portion 25. End portion 21a is then folded about a second pair of score lines 22a into generally parallel relation with respect to panel 21b preferably with free end portion 21c of panel 21a disposed beneath panel 21b facing rigid central panel 25. Similarly, free end portion 21c of end panel 21b is disposed interiorly of end panel 21a. Prior to bringing end panels 21a and 21b into finally-disposed face-to-face interlocking parallel relation, flanged end portion 15a of the glass pipe section is inserted within the partially-erected blank 20. Immediately following insertion of pipe flanged portion 15a into the protective device, end panels 21a and 21b are moved together in a plane transverse to the pipe axis so that semi-circular base portions 24a and 24b fully contact and engage the flaring shoulder of the pipe end portion. The central rigid panel 25 is disposed against the planar end surface of the pipe section and the U-shaped openings provide a full aperture on one side of the device surrounding the flaring enlarged end of the pipe section.

Various modifications may be resorted to within the spirit and scope of the appended claim.

We claim:

In combination: an elongated cylindrical glass pipe section having a flange extending radially outwardly from an end thereof; and a shipping and protective device transversely engaging said end portion, said device comprising a rectangularly-shaped one-piece element of foldable sheet-like material having a central panel extending transversely across the flange of said pipe section and disposed adjacent thereto, first and second end portions disposed on opposite sides of said central panel and spaced therefrom by first and second pairs of parallel fold lines, said first and second end portions being folded about said fold lines to extend parallel to said central panel at a distance therefrom and in back-to-back relationship with respect to one another, said first and second end portions also being provided with oppositely-facing U-shaped openings formed in the opposing edges of said element that extend lengthwise of said rectangularly shaped one-piece element, said U-shaped openings defining a full aperture with one another, said aperture being smaller than the extent of said flange and engaging a portion of the cylindrical glass pipe section adjacent the flanged portion, the flange portion being retained in the space between the central panel and the first and second sections, and wherein portions of each of said first and second end portions of said rectangularly-shaped one-piece element on each side of the U-shaped opening formed therein extend substantially past the cylindrical glass pipe section and serve to prevent disengagement of the cylindrical glass pipe section from the respective end portion in all directions normal to the axis of the pipe section except the direction parallel to the respective U-shaped opening.

References Cited by the Examiner

UNITED STATES PATENTS

| | | | |
|---|---|---|---|
| 1,504,292 | 8/1924 | Wickes | 206—46 |
| 1,990,372 | 2/1935 | Cole | 215—100.5 |
| 2,143,045 | 1/1939 | Wicks | 215—100.5 |
| 2,314,491 | 3/1943 | Greenberg | 229—14 |
| 2,412,756 | 12/1946 | Smith | 206—46 |
| 2,422,152 | 6/1947 | Vatter | 206—46 |
| 2,609,091 | 9/1952 | Rothe | 206—46 |
| 2,646,165 | 7/1953 | Whitehead | 206—46 |
| 3,025,956 | 3/1962 | Baker | 206—58 |

FOREIGN PATENTS 340,079    12/1930    Great Britain.

LOUIS G. MANCENE, *Primary Examiner.*

THERON E. CONDON, *Examiner.*